Figure 1:
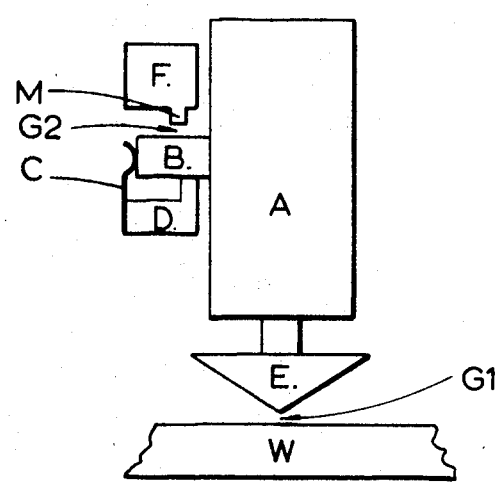

United States Patent
Smith et al.

[15] 3,673,371
[45] June 27, 1972

[54] GAP MONITORING ELECTRIC-DISCHARGE-MACHINING APPARATUS

[72] Inventors: Gordon Victor Smith; Eric John Ward, both of Gloucester, England

[73] Assignee: Sparcatron Limited, Gloucester, England

[22] Filed: March 26, 1971

[21] Appl. No.: 128,405

[30] Foreign Application Priority Data

April 14, 1970 Great Britain......................17,764/70

[52] U.S. Cl. ...........................................219/69 G, 219/69 S
[51] Int. Cl................................................B23p 1/14
[58] Field of Search ....................219/69 C, 69 G, 69 R, 69 S, 219/69 V

[56] References Cited

UNITED STATES PATENTS 3,125,700  3/1964  Bentley et al. .....................219/69 G X
3,462,576  8/1969  Ellis......................................219/69 V Primary Examiner—R. F. Staubly
Attorney—Shoemaker & Mattare

[57] ABSTRACT

The invention provides electrical discharge machining apparatus including in combination, a gap monitoring circuit registering machining energy flow across a working gap between a tool electrode and a workpiece in terms of voltage and/or current; a servo system which effects advance and retraction of the tool electrode to maintain the working gap within predetermined dimensions; a retraction detection means registering the extent of retraction of the tool electrode. In addition there is provided a subsidiary control circuit which is effective to operate at least one of (i) a warning device which may be visible or audible, (ii) means for disconnecting the supply of machining power to the inter-electrode gap, (iii) means for fully retracting the tool electrode; this subsidiary circuit being effective only when the following conditions exist simultaneously: the gap monitoring circuit registers machining energy flow at normal working levels and the retraction detection means registers retraction of the tool electrode to such an extent that the tool electrode and the workpiece are separated by more than a predetermined distance.

6 Claims, 4 Drawing Figures

INVENTORS
GORDON VICTOR SMITH
BY ERIC JOHN WARD

Shoemaker and Mattare
ATTORNEYS

GAP MONITORING ELECTRIC-DISCHARGE-MACHINING APPARATUS

This invention relates to electrical discharge machining apparatus in which a succession of discrete electrical discharges takes place between an electrically conductive tool electrode and a workpiece, thus removing material from the workpiece.

During normal operation the tool electrode and the workpiece are immersed in a bath of dielectric fluid and there is a working gap of between approximately 0.0005 inch and 0.020 inch between the tool electrode and the workpiece, across which the electrical discharges take place. Under normal spark-machining conditions the material eroded from the workpiece by the spark discharges is flushed away by the dielectric and the working gap is increased in size.

An automatic servo system, which controls the relative position of the tool electrode and the workpiece (normally by positioning the electrode relative to a fixed workpiece), then advances the tool electrode towards the workpiece so that the correct working gap is restored. This control is initiated by an electrical signal from a gap monitoring circuit which measures machining energy flow in terms of voltage and/or current across the working gap and which indicates an 'open circuit' when the gap is too large for electrical discharges to take place across it. Similarly, if either the tool electrode advances too far or conductive debris bridges the working gap, a 'short circuit' is indicated by the gap monitoring circuit which causes the servo system to retract the electrode.

With this type of control spark machining normally takes place satisfactorily. Electrical discharges always occur at the closest point between tool electrode and the workpiece and material is progressively removed from the workpiece to the shape of the tool electrode.

However, a situation can arise in which the machining debris and carbon (produced by breakdown of the dielectric oil by sparking) are not removed effectively from the working gap. Since this swarf is electrically conductive, spark discharges take place between one member, either the tool electrode or workpiece, and the swarf which is in contact with the other member.

These discharges cause heating of the swarf which is then fused to either the tool electrode or workpiece and, since it creates a local 'high spot', discharges occur repeatedly at this point. The continued heating causes the swarf to attain a temperature above that of the melting point of either the tool electrode or the workpiece and, eventually, to damage one or both of the workpiece and the tool electrode. This phenomenon is known variously as 'burning' or 'arcing' and is a serious hazard, particularly when the tool electrode is of graphite since this material is a poor heat conductor and accordingly the tool electrode can suffer severe damage.

Attempts have been made to identify the 'burning' condition in order that action may be taken to switch off the electrical power and/or retract the tool electrode and provide a suitable warning to the machine operator. However, these attempts have met with little success since the electrical parameters of voltage and current in the working gap during 'burning' are substantially the same as during conditions of normal working.

The purpose of this invention is to provide a method differentiating between a 'burning' and a normal working condition so that corrective action may be taken.

It has been noted that, since material is fused to either the tool electrode or the workpiece during a 'burning' condition the servo control automatically retracts the electrode so that the working gap is maintained, albeit between the swarf and the electrode or workpiece. During normal machining the electrode and workpiece will not be separated by more than a working distance of say 0.0005 inch to 0.020 inch unless there is either a 'short circuit' due to swarf being trapped between the electrode and side wall of the impression, or an 'open circuit' where a short circuit has been cleared and the electrode has not yet regained its working position.

Should machining energy flow in terms of voltage and/or current (i.e., neither short circuit nor open circuit) be registered at normal working levels simultaneously with the tool electrode having been retracted to such an extent when the electrode and workpiece are separated by more than the normal working distance, it is almost certainly due to a 'burn' condition in the working gap.

The invention provides electrical discharge machining apparatus including in combination:
a. a gap monitoring circuit registering machining energy flow across a working gap between a tool electrode and a workpiece in terms of voltage and/or current;
b. a servo system which effects advance and retraction of the tool electrode to maintain the working gap within predetermined dimensions;
c. a retraction detection means registering the extent of retraction of the tool electrode, and
d. a subsidiary control circuit which is effective to operate at least one of:
  i. a warning device which may be visible or audible,
  ii. means for disconnecting the supply of machining power to the inter-electrode gap,
  iii. means for fully retracting the tool electrode;
e. said subsidiary circuit being effective only when the following conditions exist simultaneously:
  1. the gap monitoring circuit registers machining energy flow at normal working levels, and
  2. the retraction detection means registers retraction of the tool electrode to such an extent that the tool electrode and the workpiece are separated by more than a predetermined distance.

Gap monitoring circuits for measuring machining energy flow in terms of voltage and/or current and for detecting when these depart from normal parameters are well-known in the art.

The retraction detection means which measures the retraction of the electrode and detects when the retraction continues after the electrode and workpiece are separated by more than a predetermined distance may take simple mechanical form. For example, it may comprise in combination a block resiliently urged in frictional engagement against the surface of a bar member arranged to move with the tool electrode. The block is allowed movement, in a direction of movement parallel to that in which the tool electrode moves towards or away from the workpiece, between a pair of stops. The stops are separated by a gap such that the distance over which the block is permitted to move corresponds to the maximum size of the working gap between the tool electrode and workpiece in the direction of movement of the former under conditions of normal working.

As the tool electrode advances into the cavity formed in the workpiece the block is carried by friction against one of the stops and thereafter if the tool electrode continues to advance slippage occurs between the block and the surface against which it is resiliently urged with the block being maintained against the said stop. If, however, the tool electrode is retracted the block will be carried by friction towards the second stop, and if the distance through which the electrode is retracted is sufficiently large, the block will abut the second stop. If therefore, retraction continues the block will be arranged to operate a micro switch to indicate that the working gap between the tool electrode and the workpiece has been enlarged beyond normal parameters.

If, at the same time, the gap monitoring circuit is registering machining energy flow at normal working levels, this combination of detections will indicate a 'burn' condition at the working gap.

Figure 2:
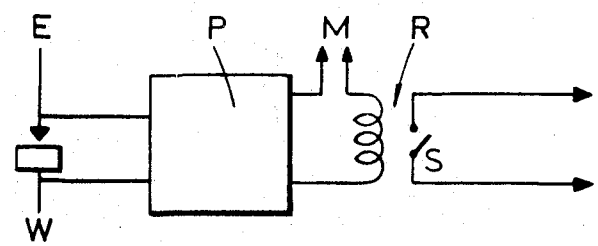
Figure 3:
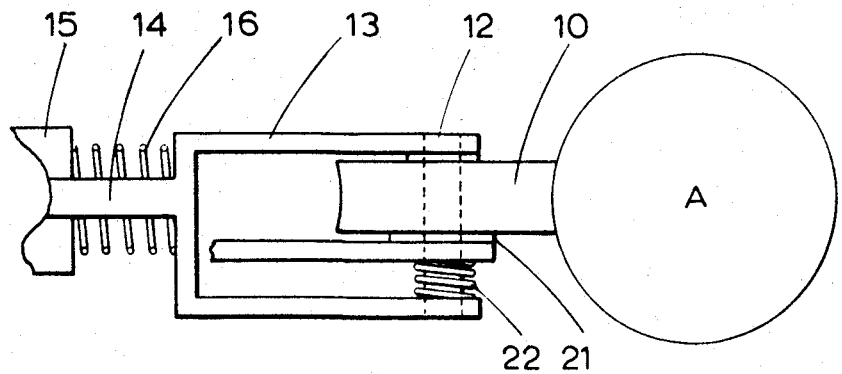
Figure 4:
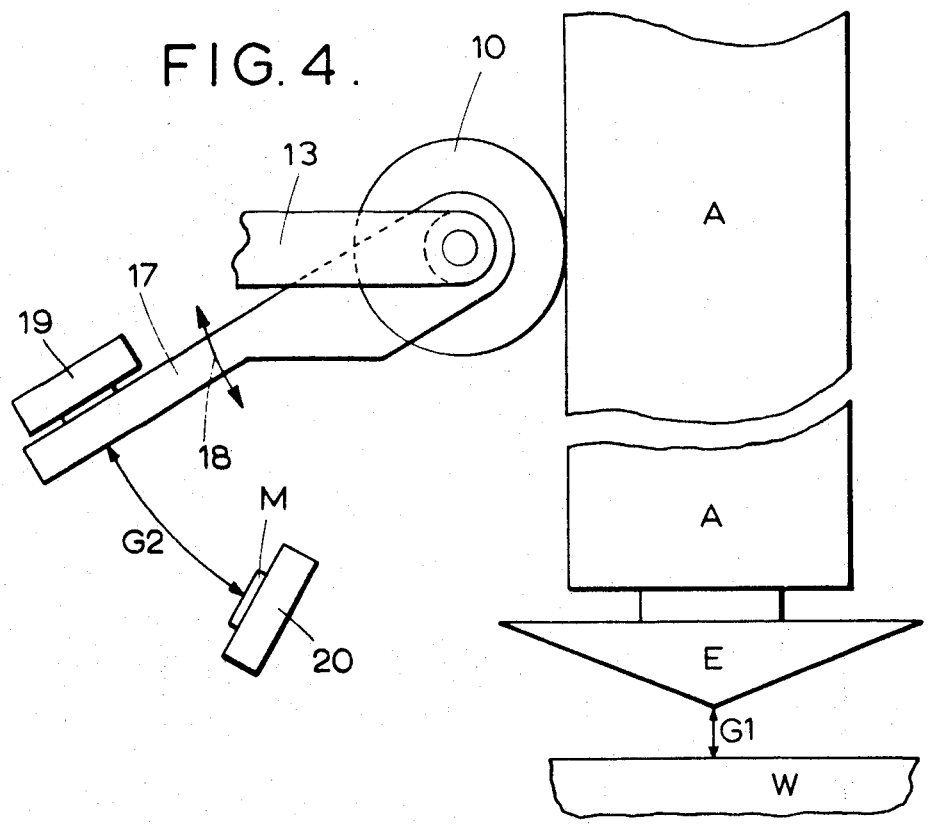

The invention will be further described by way of example with reference to the accompanying diagrammatic drawings in which:

FIG. 1 is a side view of a first embodiment;
FIG. 2 is a circuit diagram;
FIG. 3 is a side view of a second embodiment; and FIG. 4 is a view taken in the direction of the arrow IV in FIG. 3.

A first example of a simple form of the device to detect retraction of the electrode when the workpiece and electrode are separated by more than a fixed distance, say 0.20 inch, is shown in FIG. 1.

A movable block B is spring-loaded by a spring C against the moving bar A which is attached to move with the electrode E. As the electrode E descends under the control of a servo system of known form (not shown) towards the workpiece W the block B also moves downwards until it contacts the fixed lower stop D when the bar A continues to slide against it.

G1 represents a predetermined maximum distance separating the electrode E and the workpiece W under normal working conditions, and as indicated above this distance may typically be 0.20 inch.

F represents an adjustable stop carrying a micro switch M, and G2 represents the distance between the block B and the micro switch M. The stop F is so adjusted that when the block B bears against the fixed stop D, G2 substantially equals G1.

Immediately the electrode E retracts, the block B rises and closes the gap G2 and, if it continues to rise, operates the micro switch M. Thus assuming that the lowest excursion of the tool electrode E during machining is a temporary contact with the workpiece W, the micro switch M is operated only when the tool electrode retracts further than the gap G2 which is adjusted to say, 0.020 inch to correspond with the maximum size of the working gap G under normal machining conditions.

Referring to FIG. 2, the micro switch M is connected in series with the output of a known gap monitoring circuit generally designated P, to a relay R. Contact S of relay R is then operated by the required combination of normal machining energy flow and actuation of the micro switch M. The contact S is then utilized in a subsidiary circuit in a well-known manner to operate a warning and/or to disconnect matching power and/or to retract the tool electrode E fully.

A second example of a simple device for detecting electrode retraction is shown in FIGS. 3 and 4. In this A again represents a bar which is attached to move with the electrode E.

A roller 10 rotates on an axle carried by a yoke 13. Yoke 13 has a rod 14 movable axially in a sleeve 15, and 16 represents a spring which tends to urge the roller 10 against the bar A.

Also arranged on axle 12 is an arm 17 which can pivot in the arc shown by the arrow 18, between a fixed stop 19 and an adjustable stop 20 carrying a micro switch M.

21 represents a disc of high friction material attached to the side of the roller 10 and 22 represents a spring urging the arm 17 into frictional engagement with the disc 21.

As the electrode E is advanced towards the workpiece W, under the control of a servo system (not shown) of known form, the bar A moves with it and roller 10 is rotated. As the roller 10 rotates the frictional engagement with the washer 21 causes the arm 17 to pivot about the axle 12 until it abuts the fixed stop 19. In this condition the stop 20 is adjusted so that the distance G2 between the arm 17 and the micro switch M corresponds with G1, the maximum dimension of the working gap during normal working conditions.

If the electrode E advances further after the arm 17 has abutted the stop 19 the washer 21 will slip against the arm 17 as the roller 10 continues to rotate.

If, however, the electrode E retracts, the roller 10 will reverse and the arm 17 will be pivoted towards the abutment 20 and will abut the micro switch M, when the arm is moved over an angle greater than that corresponding to G1, the maximum dimension of the inter-electrode gap under normal working conditions.

The micro switch M will be employed with a circuit corresponding to that above described with reference to FIG. 2, whereby if the micro switch is actuated and at the same time the gap monitoring circuit detects a machining pulse of normal working energy values in terms of current of voltage, the subsidiary circuit operates a warning and/or to disconnect machining power and/or to retract the electrode E fully.

By the present invention improved apparatus for electrical discharge machining is obtained.

We claim:

1. Electrical discharge machining apparatus including in combination:
   a. a gap monitoring circuit registering machining energy flow across a working gap between a tool electrode and a workpiece in terms of voltage and/or current;
   b. a servo system which effects advance and retraction of the tool electrode to maintain the working gap within predetermined dimensions;
   c. a retraction detection means registering the extent of retraction of the tool electrode and
   d. a subsidiary control circuit which is effective to operate at least one of:
      i. a warning device which may be visible or audible,
      ii. means for disconnecting the supply of machining power to the inter-electrode gap,
      iii. means for fully retracting the tool electrode;
   e. said subsidiary circuit being effective only when the following conditions exist simultaneously:
      1. the gap monitoring circuit registers machining energy flow at normal working levels and
      2. the retraction detection means registers retraction of the tool electrode to such an extent that the tool electrode and the workpiece are separated by more than a predetermined distance 2. Electrical discharge machining apparatus according to claim 1, wherein the retraction detection means comprises in combination a block resiliently urged in frictional engagement against the surface of a bar member arranged to move with the tool electrode as the latter is advanced and retracted, the block being permitted movement, between a pair of stops, such movement being in a direction parallel to the movement of the tool electrode, and wherein said stops are separated by a gap such that the movement permitted to the block corresponds to predetermined maximum size of the working gap under normal working conditions.

3. Electrical discharge machining apparatus according to claim 2, wherein the stop abutted by the block during movement in retraction of the tool electrode, carries a micro switch adapted to be actuated by contact with the block.

4. Electrical discharge machining apparatus according to claim 2, wherein at least one of the stops is adjustable so that the gap separating the stops may be varied.

5. Electrical discharge machining apparatus according to claim 1, wherein the retraction detection means comprises in combination, a roller carried on an axle and resiliently urged in frictional engagement against the surface of a bar member arranged to move with the tool electrode as the latter is advanced and retracted, a disc of high friction material secured to one side of said roller, an arm journalled on the axle and urged against said disc and a portion of said arm spaced radially from said axle being free to move arcuately between a pair of stops, the spacing between said stops being adjustable so that it may be made to correspond to a predetermined maximum size of the working gap under normal working conditions.

6. Electrical discharge machining apparatus according to claim 5, wherein at least one of the stops carries a micro switch adapted to be actuated by contact with the arm.

* * * * *